United States Patent
Niessen et al.

(10) Patent No.: US 10,173,519 B2
(45) Date of Patent: Jan. 8, 2019

(54) MOTOR VEHICLE HAVING A FRAME-LIKE ASSEMBLY CARRIER AS A COMPONENT OF A BODYWORK IN THE FRONT END REGION

(71) Applicant: FORD GLOBAL TECHNOLOGIES, LLC, Dearborn, MI (US)

(72) Inventors: Bert Niessen, Heimbach (DE); Darren John Wood, Canvey Island Essex (GB); Stefan Kuehne, Munich (DE); Neil McGregor, Colchester (GB); Scott James Martin, Canvey Island Essex (GB); Henry Ward, Munich (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 5 days.

(21) Appl. No.: 15/673,983

(22) Filed: Aug. 10, 2017

(65) Prior Publication Data
US 2018/0043765 A1 Feb. 15, 2018

(30) Foreign Application Priority Data
Aug. 10, 2016 (DE) .................. 10 2016 214 827

(51) Int. Cl.
*B60K 13/02* (2006.01)
*B60R 13/08* (2006.01)
(Continued)

(52) U.S. Cl.
CPC .............. *B60K 13/02* (2013.01); *B60K 11/04* (2013.01); *B60R 13/0846* (2013.01);
(Continued)

(58) Field of Classification Search
None
See application file for complete search history.

(56) References Cited

U.S. PATENT DOCUMENTS 5,573,299 A * 11/1996 Masuda ................ B60K 11/04
180/68.4
7,766,418 B2 8/2010 Hemmersmeier
(Continued)

FOREIGN PATENT DOCUMENTS

DE 19850589 5/2000
DE 102005028834 12/2006
(Continued)

*Primary Examiner* — John D Walters
*Assistant Examiner* — Hilary L Johns
(74) *Attorney, Agent, or Firm* — Jason Rogers; Brooks Kushman P.C.

(57) ABSTRACT

A motor vehicle having a frame-like assembly carrier as a component of a bodywork in the front end region of the motor vehicle which is driven by means of an internal combustion engine. The assembly carrier has an inner side and an outer side and includes a plurality of web-like carriers. In the installation position of the assembly carrier, two lateral carriers spaced apart from each other are connected by an upper carrier with a frame being formed. The upper web-like carrier has at least one air passage defined by the upper carrier which leads from the outer side to the inner side of the assembly carrier. A suction system is arranged on the inner side of the assembly carrier for supplying the internal combustion engine with air. At least one air inlet opening of the suction system adjoins at least one air passage of the upper carrier.

20 Claims, 3 Drawing Sheets

(51) Int. Cl.
  *F02M 35/10* (2006.01)
  *B60K 11/04* (2006.01)
  *F02M 35/04* (2006.01)
  *F02M 35/12* (2006.01)

(52) U.S. Cl.
  CPC .... *F02M 35/048* (2013.01); *F02M 35/10013* (2013.01); *F02M 35/10091* (2013.01); *F02M 35/10268* (2013.01); *F02M 35/10321* (2013.01); *F02M 35/1255* (2013.01)

(56) References Cited

U.S. PATENT DOCUMENTS

| | | | |
|---|---|---|---|
| 7,845,466 B2 | 12/2010 | Kostun et al. | |
| 8,485,295 B2 | 7/2013 | Mildner | |
| 9,211,791 B2 * | 12/2015 | Laakso | B60K 13/02 |
| 2003/0188902 A1 * | 10/2003 | Decuir | B60K 13/02 |
| | | | 180/68.3 |
| 2006/0006011 A1 * | 1/2006 | Khouw | B60K 13/02 |
| | | | 180/68.3 |
| 2008/0203766 A1 * | 8/2008 | Hemmersmeier | B62D 25/084 |
| | | | 296/203.02 |

FOREIGN PATENT DOCUMENTS

| | | |
|---|---|---|
| DE | 102007053187 | 5/2008 |
| DE | 102008041438 | 5/2009 |
| DE | 102009031746 | 1/2011 |
| DE | 102009039806 | 3/2011 |
| DE | 102010051366 | 5/2012 |
| DE | 10209132 | 11/2015 |
| DE | 102013006245 | 12/2016 |

\* cited by examiner

MOTOR VEHICLE HAVING A FRAME-LIKE ASSEMBLY CARRIER AS A COMPONENT OF A BODYWORK IN THE FRONT END REGION

CROSS-REFERENCE TO RELATED APPLICATIONS

This application claims foreign priority benefits under 35 U.S.C. § 119(a)-(d) to DE Application 10 2016 214 827.3 filed Aug. 10, 2016, which is hereby incorporated by reference in its entirety.

TECHNICAL FIELD

The invention relates to a motor vehicle having a frame-like assembly carrier as a component of a bodywork in the front end region of the motor vehicle. The assembly carrier has an inner side and an outer side and comprises four web-like carriers. In the installation position of the assembly carrier, two lateral carriers are spaced apart from each other and are connected by means of a lower carrier and an upper carrier with a frame.

BACKGROUND

Motor vehicles are generally provided with an internal combustion engine. A suction system supplies the internal combustion engine with combustion air. Charge air cooling is often provided to reduce the temperature of the drawn-in air and to increase the density of the air. The charge air cooling contributes to better filling of the cylinders. This affords advantages particularly when a charging of the internal combustion engine is provided and the charge air is heated as a result of compression or the internal combustion engine has an exhaust gas return in which the hot exhaust gas is introduced into the suction system upstream of the cooler. In both cases, cooling air prior to introduction into the cylinders has been found to be particularly advantageous.

The arrangement of the internal combustion engine and the associated units or components with respect to each other in the engine compartment is subjected to many requirements. Arranging the suction system in the engine compartment relative to the bodywork of a motor vehicle creates problems relating to meeting all of the requirements.

The structure of the assembly carrier and the bodywork-related arrangement of the engine, in particular the suction system, in the motor vehicle is arranged to improve the favorable crash behavior of the vehicle. Absorption of accident energy and deformation of the bodywork to maintain passenger compartment survival space is a priority. Providing sufficiently large deformation paths leads to a corresponding spacing of the engine from the walls of the engine compartment, for example, the engine hood, the cover plates and the assembly carrier.

FIG. 1A is a perspective illustration of a fragment of an assembly carrier 11 according to the prior art together with the suction system 12. The assembly carrier 11 is part of a bodywork of a motor vehicle in the front end region and has four web-like carriers 11a, 11b, 11c, of which in FIG. 1A only three carriers 11a, 11b, 11c are illustrated or indicated. In the shown installation position of the assembly carrier 11, an upper carrier 11c which extends transversely has two lateral carriers 11a, 11b which are spaced apart from each other. The four carriers 11a, 11b, 11c of the assembly carrier 11 form a frame which generally serves to receive a cooling device.

The suction system 12 is partially arranged above the assembly carrier 11 and at the rear side or the inner side of the assembly carrier 11. The suction system 12 serves to supply the internal combustion engine with air and has to this end an air inlet opening 12a. The air striking the front end region of the motor vehicle is directed from the outer side of the assembly carrier 11 via an indentation or recess 13 (shown in FIG. 16) to the rear side of the assembly carrier 11 and into the air inlet opening 12a of the suction system 12. Air is often supplied to a filter to be cleaned by the suction system 12.

FIG. 1B shows in an enlargement the connection of the suction system 12 to the assembly carrier 11 according to FIG. 1A, wherein the suction system 12 is illustrated offset to the rear in order to make the indentation or recess 13 clearly visible.

The indentation or recess supplies air to the suction system but weakens the upper carrier of the assembly carrier and reduces the rigidity of the upper carrier. There is generally more than one indentation provided in the carrier to accommodate a large number of variants using one assembly carrier. This design of the upper carrier enables the installation of suction systems with one air inlet opening or installation of suction systems with more than one air inlet opening. Suction systems with two or more air inlet openings and of different lengths that require different indentations. The rigidity of the assembly carrier is reduced as the number of indentations increase.

The web height of the upper carrier cannot be freely determined or selected with regard to the rigidity of the upper carrier. The web height is significantly influenced or limited by the legally prescribed pedestrian protection and the spatial requirement of increasingly larger cooling devices received by the assembly carrier. The suction system is arranged partially above and partially behind the assembly carrier and must be taken into account. The confined spatial conditions, significantly limits the structural configuration of the assembly carrier or the upper carrier, and positioning of the suction system.

Pulsations of the internal combustion engine may cause the suction system to oscillate.

The increasing noise emission is an environmental problem that has a disadvantageous effect on the quality of life and the health of persons subjected to the increasing noise. A large number of regulations have been introduced to limit noise. The regulations include the Bundes-Immissionsschutzgesetz (BImSchG) (Federal Emission Protection Act) and the guidelines of the European Commission.

The internal combustion engine is the dominant source of noise of the motor vehicle, but all sources of noise that contribute to the overall noise emission must be taken into consideration to comply with the increasingly strict regulations with regard to the admissible noise emission of a motor vehicle.

Attempts are made to influence and model the noise caused by the internal combustion engine in a selective manner by noise design or sound design. Customers purchasing a vehicle are influenced in a significant manner and to an increasing extent by the noise of the internal combustion engine of the vehicle.

High frequency noise may be caused by oscillation excitation of the suction system. Prior art means for reducing noise emissions may include resonators for damping noise.

Installing a resonator in the suction system requires greater cross-sections or large-volume suction systems. Providing a resonator increases the rigidity of the suction system.

Against this background, an object of the present invention is to provide a motor vehicle with an improved assembly carrier in particular with regard to rigidity by providing the air supply to the suction system with cost advantages.

SUMMARY

This object is achieved by a motor vehicle having a frame-like assembly carrier as a component of a bodywork in the front end region of the motor vehicle which is driven by means of an internal combustion engine. The assembly carrier has an inner side and an outer side and comprises four web-like carriers. In the installation position of the assembly carrier, two lateral carriers spaced apart from each other are connected by means of a lower carrier and an upper carrier forming a frame. The upper web-like carrier has at least one air passage that leads from the outer side to the inner side of the assembly carrier. A suction system is arranged on the inner side of the assembly carrier for supplying the internal combustion engine with air. The suction system has at least one air inlet opening adjoining at least one air passage of the upper carrier.

The upper carrier of the assembly carrier of the motor vehicle according to the invention has at least one channel-like air passage that serves to supply air to the suction system and that directs air from the outer side to the inner side of the assembly carrier.

Each air passage according to the invention is integrated into the upper carrier and is fully surrounded by carrier material, or enclosed by material of the upper carrier. The entire web height of the upper carrier can be used to form an air passage with the walls of the air passage being formed by the upper carrier.

No indentations or recesses are provided or required in the upper carrier to supply air to the suction system. Weakening of the upper carrier by indentations or recesses is eliminated. The assembly carrier function provides the bodywork of the motor vehicle with the desired rigidity in the front end region that is not reduced by the need to supply air to the suction system. The configuration of the upper carrier provides higher levels of rigidity compared to the prior art.

At least one air inlet opening of the suction system adjoins at least one air passage of the upper carrier at the inner side of the assembly carrier. The air passages arranged in the upper carrier form a combined air supply together with the at least one air inlet opening of the suction system. Each air inlet opening of the suction system forms the continuation of at least one air passage provided in the carrier.

The configuration of the upper carrier with at least one air passage enables the cost-effective implementation of a large number of variants using one assembly carrier. The upper carrier is provided with a plurality of air passages to accommodate different suction systems. Different suction systems can be produced in a significantly more cost-effective manner than different assembly carriers. Significant cost savings or cost advantages may be obtained with a large number of variants, without impairing or reducing the rigidity of the assembly carrier.

One assembly carrier may be installed or introduced with different suction systems that differ in terms of the number or arrangement of air inlet openings. All the air passages provided in the upper carrier can be used, by one air inlet opening or a plurality of air inlet openings, but also some of the air passages provided in the upper carrier may remain unused. An unused air passage in the upper carrier may be blocked by a cover and deactivated.

The configuration of the upper carrier according to the invention enables an increased web height compared to the prior art because the suction system is not arranged above the carrier, but instead is arranged behind the carrier on the inner side of the assembly carrier. The upper carrier forms an integral structural unit with the suction system. The suction system can be constructed with a larger volume. An additional 1.5 litre can be used for the suction system. The provision of means for reducing noise emissions, in particular resonators which act as noise dampers, is thereby facilitated or enabled.

A motor vehicle is disclosed that has an improved assembly carrier with respect to the rigidity and the air supply to the suction system that affords cost advantages.

Other advantageous embodiments of the motor vehicle are explained in connection with the dependent claims.

Embodiments of the motor vehicle are advantageous in which the upper web-like carrier has at least two air passages which are implemented fully in the upper carrier and which lead from the outer side to the inner side of the assembly carrier.

In this instance, the upper carrier has two or more air passages. This enables the installation of quite different suction systems, wherein each unused air passage is covered or blocked by a cover or the like.

Suction systems having two air inlet openings which are spaced apart from each other and which use all the air passages provided in the upper carrier or only some of a plurality of air passages provided in the upper carrier. Suction systems of different lengths may be installed that have only one air inlet opening.

At least two air passages may be arranged eccentrically in the upper carrier. A lock or locking device for the hood may be centrally arranged in the upper carrier that leaves no central structural space as required for an air passage. Air passages that are spaced apart from each other eccentrically enable the production of a large number of variants to accommodate the installation of suction systems of different lengths.

At least two air passages may be arranged eccentrically at both sides of the center in the upper carrier.

At least two air passages may be configured to form at least two groups each having at least one air passage. The configuration or grouping of the air passages affords the possibility of associating an air inlet opening of the suction system with each group or not associating an air inlet opening of the suction system with a group.

At least one group may comprise at least two air passages, wherein adjacent air passages of a group are separated from each other by means of a rib in the upper carrier. One rib is sufficient to separate adjacent air passages of a group from each other and increases the rigidity of the upper carrier and the frame-like assembly carrier. The rib supports the assembly carrier to provide the bodywork of the motor vehicle with the desired rigidity in the front end region.

In particular embodiments, a first group may comprise at least three air passages and a second group may comprise at least two air passages.

If the upper carrier has two or more air passages, which form at least two groups having at least one air passage in each case, the suction system may have an air inlet opening that covers at least one air passage of the first group or the second group. The suction system does not use all the air passages provided in the upper carrier to supply air to the internal combustion engine, but instead only the air passages of a group or at least one air passage of this group.

The assembly carrier enables the installation of suction systems of different lengths, wherein the suction system uses either at least one air passage of the first group or at least one air passage of the second group to supply the internal combustion engine with air.

If the upper carrier has two or more air passages which form at least two groups each having at least one air passage, the suction system may have two air inlet openings, wherein a first air inlet opening covers at least one air passage of the first group and a second air inlet opening covers at least one air passage of the second group.

The above embodiment is particularly suitable for internal combustion engines which have an increased or high air requirement, for example, charged internal combustion engines or internal combustion engines having a large piston capacity. In both instances, large quantities of air are intended to be drawn in by the suction system with two or more air inlet openings.

If the upper carrier has two or more air passages, the suction system may have at least one cover which covers and blocks at least one air passage of the upper web-like carrier. It may be advantageous to cover and block each unused air passage using a cover. The unused air passage is deactivated so that the air which strikes the assembly carrier, that is to say, the impinging travel wind, is afforded no possibility of discharge. There is then no bypass to the active used air passages.

If the upper carrier has at least two groups of air passages, of which at least one group comprises at least two air passages, the suction system may have at least two covers, wherein a first cover covers and blocks at least one air passage of the first group and a second cover covers and blocks at least one air passage of the second group. This embodiment is described in connection with FIG. 3.

The assembly carrier may receive a cooling device that is bounded by the four carriers of the assembly carrier.

The cooling device may comprise a heat exchanger and/or a ventilator.

The suction system may have a strip-like sealing lip that is in abutment with the cooling device and prevents air from flowing past the cooling device. A strip-like, preferably soft sealing lip may be provided or injected in the suction system which affords clear cost advantages compared with the highly priced plastics materials used with conventional suction systems.

The suction system may be provided with at least one resonator. Reference is made to the statements which have already been made with regard to the noise emission and the measures for noise reduction or noise design.

The suction system may be produced from plastics material. Plastics material affords advantages in the production and with regard to the weight of the suction system.

The suction system may be produced from plastics material by injection-molding method.

The invention is described in greater detail below with reference to an embodiment and according to FIGS. 1A, 1B, 2A, 2B and 3, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
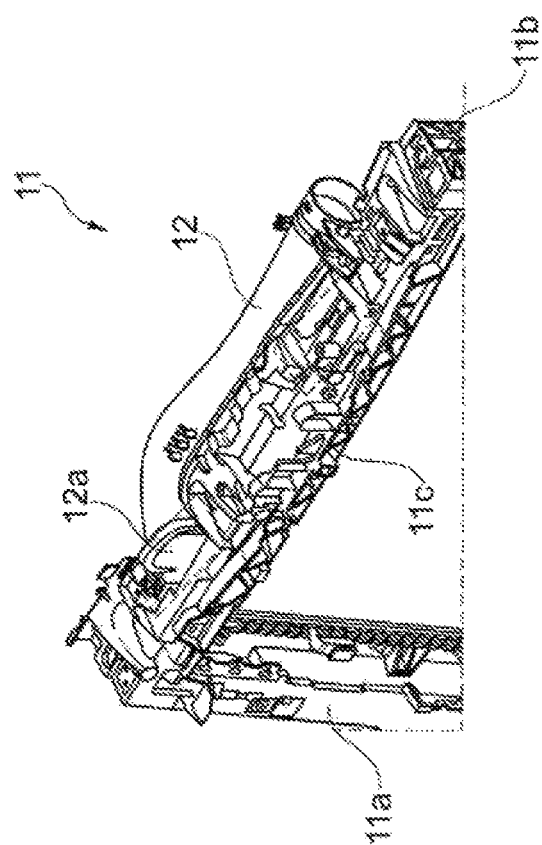
FIG. 1A is a perspective illustration of a fragment of an assembly carrier according to the prior art together with a suction system.
Figure 1B:
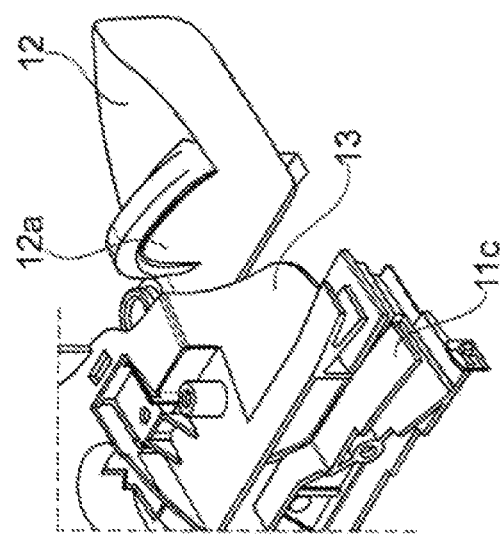
FIG. 1B is an enlargement of the connection of the suction system to the assembly carrier according to FIG. 1A.

FIGS. 1A and 1B have previously been extensively described above with the explanation of the prior art.

Figure 2A:
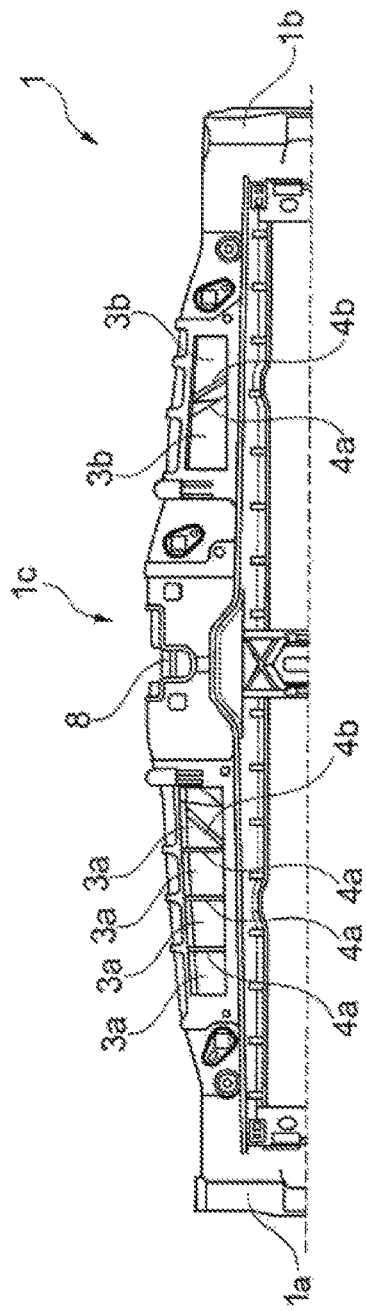
FIG. 2A is a front elevation view of the outer side of a fragment of an assembly carrier according to a first embodiment of the motor vehicle.

FIG. 2A shows in a view of the outer side of a fragment of an assembly carrier 1 according to a first embodiment of the motor vehicle.

The assembly carrier 1 comprises four web-like carriers 1a, 1b, 1c which form a frame, wherein two lateral carriers 1a, 1b are spaced apart from each other and connected to each other by means of an upper carrier 1c. The frame-like assembly carrier 1 is a component of the bodywork of a motor vehicle in the front end region. A lock 8 for the engine hood is arranged centrally in the upper carrier 1c.

The upper web-like carrier 1c has a plurality of air passages 3a, 3b which are integrated in the upper carrier 1c and which lead from the outer side 7a to the inner side 7b (shown in FIG. 2B) of the assembly carrier 1.

In the embodiment illustrated in FIG. 2A, the air passages 3a, 3b are arranged eccentrically and at both sides of the center in the upper carrier 1c. The air passages 3a, 3b are grouped to form two groups. A first group comprises four adjacent air passages 3a and a second group comprises two adjacent air passages 3b.

Figure 2B:
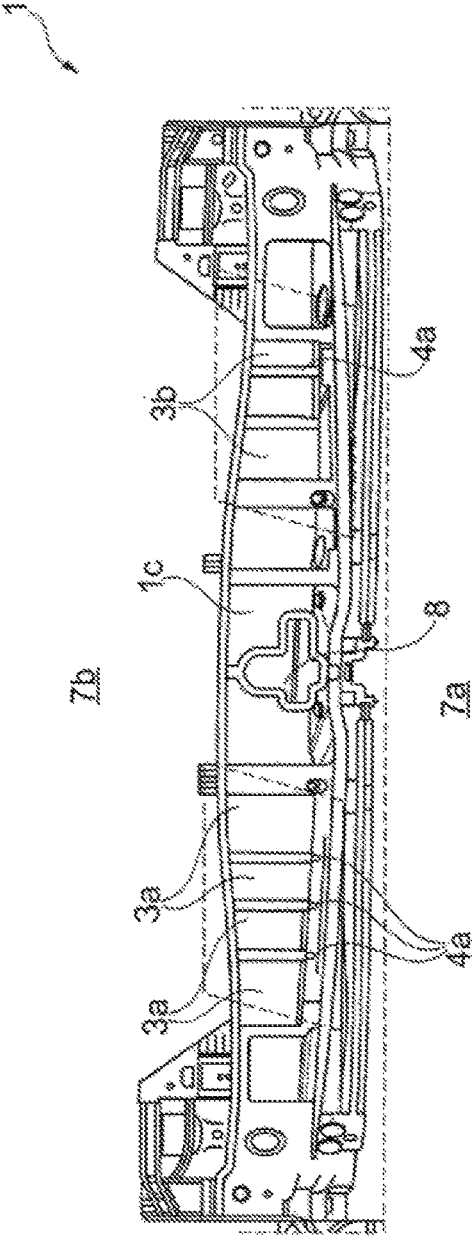
FIG. 2B is a top plan view of the upper carrier, showing the assembly carrier illustrated in FIG. 2A as a partially sectioned view.
Figure 3:
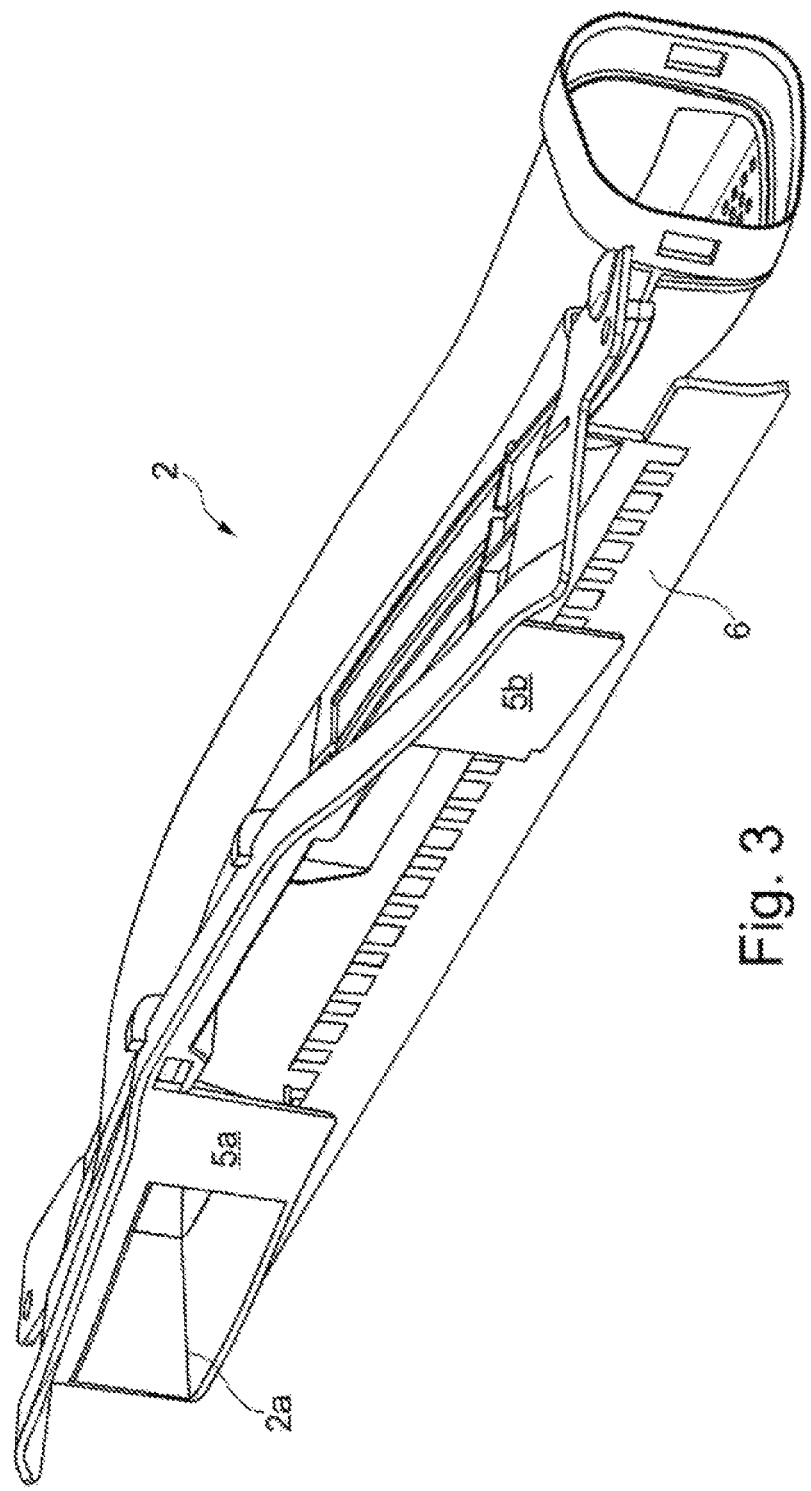
FIG. 3 is a perspective illustration of a suction system that may be used with the assembly carrier of FIG. 2A.

Referring to FIGS. 2A, 2B and 3, the grouping of the air passages 3a, 3b affords the possibility of associating an air inlet opening 2a of the suction system 2 with each group or not associating an air inlet opening 2a of the suction system 2 with a group.

Adjacent air passages 3a, 3b of a group are separated from each other by means of a rib 4a in the upper carrier 1c. Each rib 4a separates two adjacent air passages 3a, 3b of a group from each other in technical flow terms and additionally reinforces the upper carrier 1c. In this instance, an air passage 3a, 3b of each group is provided with an additional reinforcement rib 4b which in the front view of FIG. 2A extends diagonally and also serves to reinforce the upper carrier 1c.

FIG. 2B is a top plan view of the upper carrier 1c of the assembly carrier 1 illustrated in FIG. 2A, that is to say, as a view which is rotated through 90° with respect to FIG. 2A.

FIG. 3 is a perspective illustration of the suction system 2 that may be used with the assembly carrier 1 of FIGS. 2a and 2b.

The illustrated suction system 2 is arranged on the inner side 7b of the assembly carrier 1 and serves to supply the internal combustion engine with air. The suction system 2 illustrated in FIG. 3 has an individual air inlet opening 2a which adjoins some, but not all air passages 3a of the first group of the upper carrier 1c, that is to say, covers them.

Each unused air passage 3a of the first group is covered and blocked by means of a first cover 5a so that the air which strikes the assembly carrier 1 is not afforded any possibility of discharge and the air uses or has to use the free active air passages 3a of the first group.

The air passages 3b of the second group are in this instance not used at all and are all covered and blocked by means of a second cover 5b.

The suction system 2 has a strip-like sealing lip 6 which is in abutment with a cooling device which is provided in the frame-like assembly carrier 1 and which prevents air from flowing past the cooling device. The sealing lip 6 is preferably injection-molded.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle having an assembly carrier of a bodywork in a front end region of the motor vehicle which is driven by means of an internal combustion engine and in which the assembly carrier has an inner side and an outer side and comprises four web-like carriers, wherein in an installation position of the assembly carrier two lateral carriers which are spaced apart from each other are connected by means of a lower carrier and an upper carrier with a frame being formed, the motor vehicle comprising:
    at least one air passage defined by the upper carrier which leads from the outer side to the inner side of the assembly carrier; and
    a suction system arranged on the inner side of the assembly carrier for supplying the internal combustion engine with air, wherein the suction system defines at least one air inlet opening that adjoins at least one air passage of the upper carrier.

2. The motor vehicle as claimed in claim 1, wherein the upper carrier has at least two air passages defined by the upper carrier that lead from the outer side to the inner side of the assembly carrier.

3. The motor vehicle as claimed in claim 2, wherein the at least two air passages are arranged eccentrically in the upper carrier.

4. The motor vehicle as claimed in claim 2, wherein the at least two air passages are configured to form at least two groups each having at least one air passage.

5. The motor vehicle as claimed in claim 4, wherein the at least one group comprises at least two air passages, wherein adjacent air passages of a group are separated from each other by means of a rib provided in the upper carrier.

6. The motor vehicle as claimed in claim 4, wherein a first group comprises at least three air passages and a second group comprises at least two air passages.

7. The motor vehicle as claimed in claim 4, wherein the suction system has an air inlet opening which covers at least one air passage of a first group or a second group.

8. The motor vehicle as claimed in claim 7, wherein the suction system has two air inlet openings, wherein a first air inlet opening covers at least one air passage of the first group and a second air inlet opening covers at least one air passage of the second group.

9. The motor vehicle as claimed in claim 7, wherein the suction system has at least one cover which covers and blocks at least one air passage of the upper carrier.

10. The motor vehicle as claimed in claim 5, wherein the suction system has at least two covers, wherein a first cover covers and blocks at least one air passage of the first group and a second cover covers and blocks at least one air passage of the second group.

11. The motor vehicle as claimed in claim 1, wherein the assembly carrier receives a cooling device which is bounded by the assembly carrier.

12. The motor vehicle as claimed in claim 11, wherein the cooling device comprises a heat exchanger and/or a ventilator.

13. The motor vehicle as claimed in claim 11, wherein the suction system has a strip-like sealing lip in abutment with the cooling device that prevents air from flowing past the cooling device.

14. The motor vehicle as claimed in claim 1, wherein the suction system is provided with at least one resonator.

15. The motor vehicle as claimed in claim 1, wherein the suction system is produced from plastics material.

16. The motor vehicle as claimed in claim 1, wherein the suction system is produced from an injection-molded plastics material.

17. An assembly carrier of a vehicle having an internal combustion engine, comprising:
    a frame including an upper carrier that defines at least one air passage extending from an outer side to an inner side of the upper carrier; and
    a suction system arranged on the inner side of the upper carrier that supplies air to the internal combustion engine, the suction system defining an air inlet opening that adjoins the at least one air passage.

18. The assembly carrier of claim 17 wherein the at least one air passage includes a plurality of air passages that are divided into a first group and a second group.

19. The assembly carrier of claim 18 wherein the suction system further comprises:
    a cover that is arranged to block at least one of the air passages.

20. The assembly carrier of claim 17 wherein the at least one air passage includes a plurality of air passages that are divided into a first plurality of air passages and a second plurality of air passages, wherein the first plurality of air passages is separated by a first set of ribs and the second plurality of air passages is separated by a second set of ribs.

* * * * *